United States Patent [19]

Iwamoto et al.

[11] Patent Number: 4,587,582
[45] Date of Patent: May 6, 1986

[54] MAGNETIC TAPE RECORDER/PLAYER

[75] Inventors: Tadashi Iwamoto, Yotsukaido; Kimihide Tokura, Yokohama, both of Japan

[73] Assignee: Tokyo Shibaura Denki Kabushiki Kaisha, Kawasaki, Japan

[21] Appl. No.: 466,312

[22] Filed: Feb. 14, 1983

[30] Foreign Application Priority Data

Feb. 15, 1982 [JP] Japan ................. 57-22525

[51] Int. Cl.⁴ .................. G11B 5/008; G11B 15/00
[52] U.S. Cl. ........................ 360/93; 360/105
[58] Field of Search .............. 360/105, 93–96.6

[56] References Cited

U.S. PATENT DOCUMENTS 4,425,591  1/1984  Ito .................................. 360/105 X

FOREIGN PATENT DOCUMENTS 2850239  5/1979  Fed. Rep. of Germany .
DE-AS
2758195 10/1983  Fed. Rep. of Germany .
2003646  3/1979  United Kingdom .
2013017  8/1979  United Kingdom .
2029998  3/1980  United Kingdom .
2034099  5/1980  United Kingdom .
2072918 10/1981  United Kingdom .
2079032  1/1982  United Kingdom .
2108751  5/1983  United Kingdom .
2116353  9/1983  United Kingdom .

Primary Examiner—A. J. Heinz
Attorney, Agent, or Firm—Cushman, Darby & Cushman

[57] ABSTRACT

This invention relates to the performance of a soft-touch magnetic tape recorder/player. More particularly, when a magnetic tape recorder/player operating section is operated, the rotary force of the first rotor rotating irrespective of the tape feeding is transmitted to second rotor, and a tape recorder/player mechanism is operated in a predetermined operating state by the rotary force of the second rotor. In this case, a non-engaging part not engaged with the first rotor is formed in the second rotor, and the non-engaging part normally faces the first rotor. A guide part for rotating the second rotor in a direction to engage the second rotor with the first rotor is formed at the second rotor upon reception of the drive force of a lock member cooperatively operating with the operation of the tape recorder/player operating section.

12 Claims, 34 Drawing Figures

MAGNETIC TAPE RECORDER/PLAYER

BACKGROUND OF THE INVENTION

The present invention consists of a magnetic tape recorder/player and, more particularly, a magnetic tape recorder/player adapted for soft touch operations.

In a conventional magnetic tape recorder/player, a so-called "soft touch operation", in which various switches designed to operate a magnetic tape transport mechanism in predetermined feeding states (e.g., recording, reproducing, fast forwarding, and rewinding) and for returning it to a stopping state may be lightly and readily operated, has been created and is widely known. Various constructions have been considered as methods for carrying out the soft touch operation. For example, when a desired mechanical switch is slightly moved in the operating direction but only to the extent that the switch has not arrived at the normal operating position, an electrical switch is closed to drive a motor. Then the mechanical switch is moved to the normal operating position by the rotary force of the motor. In another conditional tape recorder/player a number of switches for operating a magnetic tape recorder/player in a predetermined operating state or in a stopping state are touch-sensitive switches. When the switches are operated, an LSI (large scale integrated circuit) controls solenoid plungers to control the various movable members of a magnetic tape recorder/player mechanism. The movable members are moved to such positions as to permit the recorder/player to be operated or stopped in accordance with the designated control switch.

However, the above-described soft touch operating means for the magnetic tape recorder/player are still in the process of developing their technical subject, and various problems have not yet been solved. For instance, in the conventional magnetic tape recorder/player which employs motors for moving the actuators, switches and motors have been provided for the respective control switches of various types, causing the recorder/player to have an extremely complicated structure and a large size. In the LSI-controlled conventional magnetic tape recorder/player, solenoid plungers have been used, causing the recorder/player to consume a large quantity power and accordingly to be unsuitable for a portable magnetic tape recorder/player, using a battery. Therefore, an improved magnetic tape recorder/player which can sufficiently respond to the user's needs in operation, size, and power consumption, with a mechanism to prevent erroneous operation, has heretoforce been strongly desired.

SUMMARY OF THE INVENTION

It is an object of the present invention to provide a drive mechanism for a magnetic tape recorder/player which is capable of operating effectively with a simple structure and of effectively performing a soft touch operation.

According to one aspect of the present invention, there is provided a magnetic tape recorder/player comprising a first rotor rotated irrespective of a magnetic tape feeding, a second rotor engaged with the first rotor and capable of receiving a rotary force, and formed with a part which does not engage with the first rotor at a predetermined portion, a lock member driven cooperatively with the operation of a magnetic tape recorder/player operating section, a guide section formed in the second rotor for rotating it in the direction where the second rotor is engaged with the first rotor upon reception of the operating force of the lock member, and a magnetic tape recorder/player mechanism which attains a predetermined operating state by the rotary force of the second rotor.

BRIEF DESCRIPTION OF THE DRAWINGS

Other objects and advantages will become apparent from the following description taken in conjunction with the accompanying drawings in which.

DETAILED DESCRIPTION OF THE PREFERRED EMBODIMENTS

Figure 1:
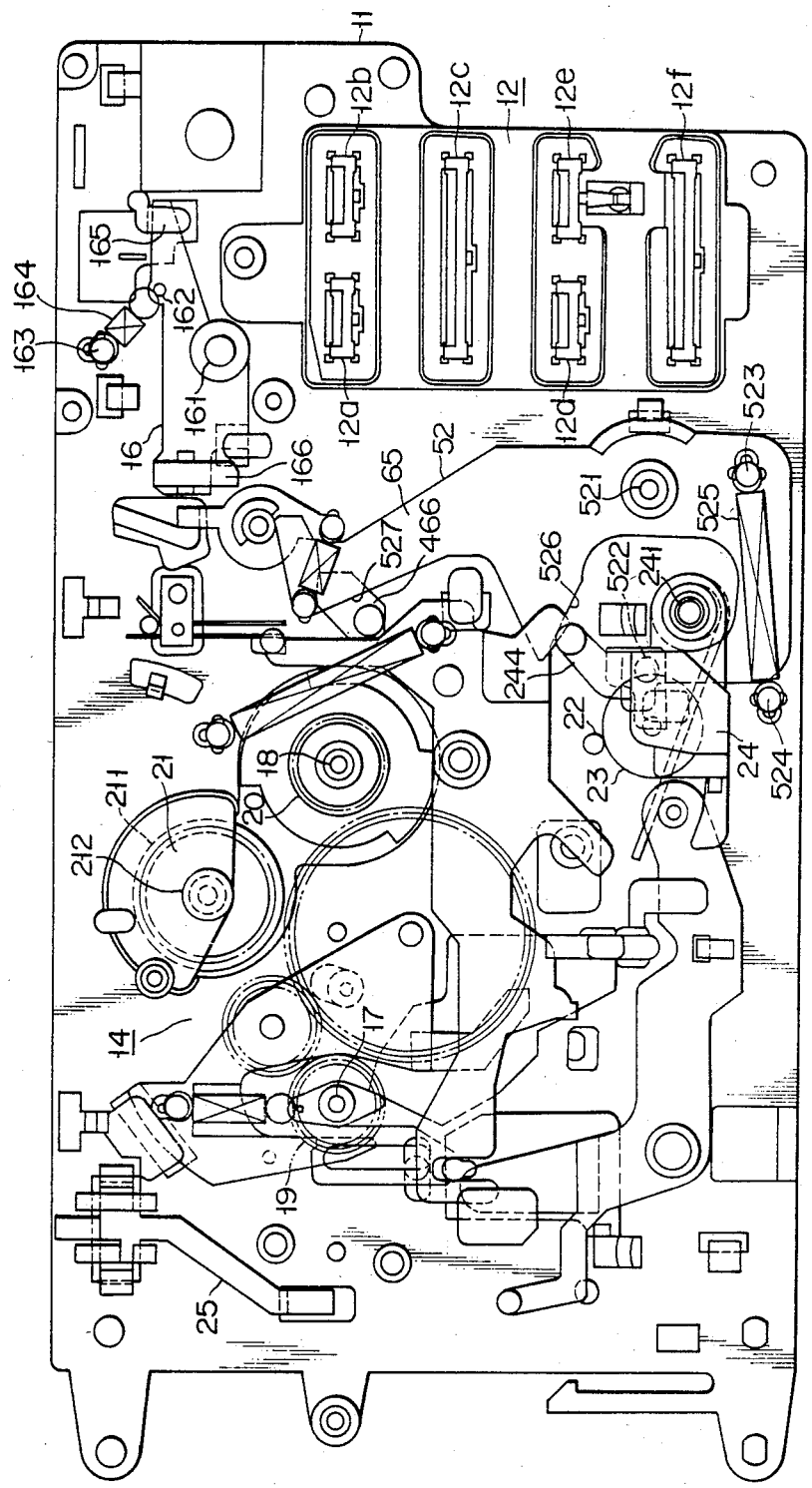
FIG. 1 and FIG. 2 are plan views showing an embodiment of a magnetic tape recorder/player according to the present invention and showing the state in which a main chassis is removed from the recorder/player in FIG. 1.

An embodiment of the present invention will now be described in more detail with reference to the accompanying drawings. FIG. 1 is a plan view showing the structure of a cassette magnetic tape recorder/player embodying the present invention. Reference numeral 11 designates a substantially rectangular main chassis formed of a synthetic resin material. An operating section 12 is located at the right side section of the main chassis 11 in FIG. 1, and a rewinding REW control switch 12a, a fast feeding FF control 12b, a reproducing PLAY control 12c, a recording REC control 12d, a pausing PAUSE control 12e, and a stopping and ejecting STOP control 12f are arranged in this order from the upper middle section of the right side section in FIG. 1. These control switches are capable of being depressed more or less vertically with respect to the plane of the main chassis 11 and of being reset. These controls 12a through 12f are engaged with a lock mechanism 13 (FIG. 2) to be described later at the back side in FIG. 1 of the main chassis 11 and are locked in the depressed state by a pressing operation. However, the STOP control 12f is not locked, but is engaged with the lock mechanism 13 so that the other controls 12a through 12d of the locked state are released. The PAUSE control 12e, which is operated independently without being engaged with the lock mechanism 13, is engaged with a known push-push mechanism (not shown) disposed at the back side (in FIG. 1) of the main chassis 11, is locked by the first passing operation to the operating position, to, for example, temporarily stop the playback state, and by the second pressing operation, to release the locked state, thereby, for example, resetting the playback state.

The REW and FF controls 12a and 12b drive a high speed feeding mechanism 14 of a magnetic tape recorder/playback mechanism 63 to be described later, thereby feeding the magnetic tape in rewinding and fast feeding states. The PLAY control 12c drives a constant speed feeding mechanism 15 (FIG. 2) as a magnetic tape recorder/playback mechanism 63 to be described later, thereby feeding the magnetic tape in the playback state. The REC control 12d drives the constant speed feeding mechanism 15 and switches a tape recorder circuit section (not shown) to a recording state, thereby feeding the tape in the recording state. It is not necessary to operate the REC control 12d together with the PLAY control 12c, but the recorder/player can be set to the recording state by independently operating the PLAY control 12c.

An eject lever 16 is provided in the upper middle section of the operating section 12 of the main chassis 11. This eject lever 16 is engaged with a rotational shaft 161 projected substantially at the center from the main chassis 11 and is rotatably supported. This eject lever 16 is engaged with a coil spring 164 between the through hole 162 formed at one end thereof and a projection 163 formed on the main chassis 11, and when the lever 16 is urged counterclockwise in FIG. 1, its one end contacts a connecting piece 165 formed on the main chassis 11.

At the other end of the lever 16 is formed a lock part 166 capable of holding a cassette cover (not shown) in the closed position in engagement with a connector formed at the cassette cover. When the STOP control 12f is operated in the state in which the REW, FF, PLAY and REC controls 12a through 12d are not operated, the lever 16 is rotated clockwise in FIG. 1 against the tension of the spring 164 cooperatively with the operation of the STOP control 12f, allowing the lock part 166 to be disconnected from the connector of the cassette cover, thereby opening the cassette cover.

Then, left and right reel shafts 17 and 18 are rotatably supported substantially at the center of the main chassis 11. At the shafts 17 and 18 gears 19 and 20, respectively, are coaxially provided in such a manner that the shafts 17 and 18 can be rotated integrally with the gears 19 and 20. When the high speed feeding mechanism 14 drives the gears 19 and 20, the shafts 17 and 18 are respectively driven in response to the rewinding and fast feeding states.

A drive gear 21 is rotatably supported substantially at the intermediate part between the shafts 17 and 18 in the upper portion of FIG. 1. This gear 21 is formed integrally and coaxially with a first gear 211 of large diameter and a second gear 212 of small diameter. The rotary force of a motor (not shown) is, for example, transmitted via a belt as a drive source for applying a rotary force corresponding to the high and constant speed feedings to the shafts 17 and 18.

Further, a capstan 22 is rotatably supported at the lower middle part in FIG. 1 of the shaft 18. This capstan 22 is a rotational shaft of a flywheel (not shown) installed at the back surface side in FIG. 1 of the main chassis. The rotary force of the motor is transmitted, for example, via a belt to the flywheel. A pinch roller 23 interlocked with the mechanism 15 detachably contacts the capstan 22. This pinch roller 23 is rotatably supported on the other end of a pinch lever 24 which is rotatably supported at one end thereof on a rotational shaft 241 projected on the main chassis 11. When the lever 24 is rotated cooperatively with the operation of the mechanism 15, the lever 24 detachably contacts the capstan 22.

An erroneous-erasure-preventing-pawl-detecting lever 25 is provided at the upper left side (in FIG. 1) of the main chassis 11.

Figure 2:
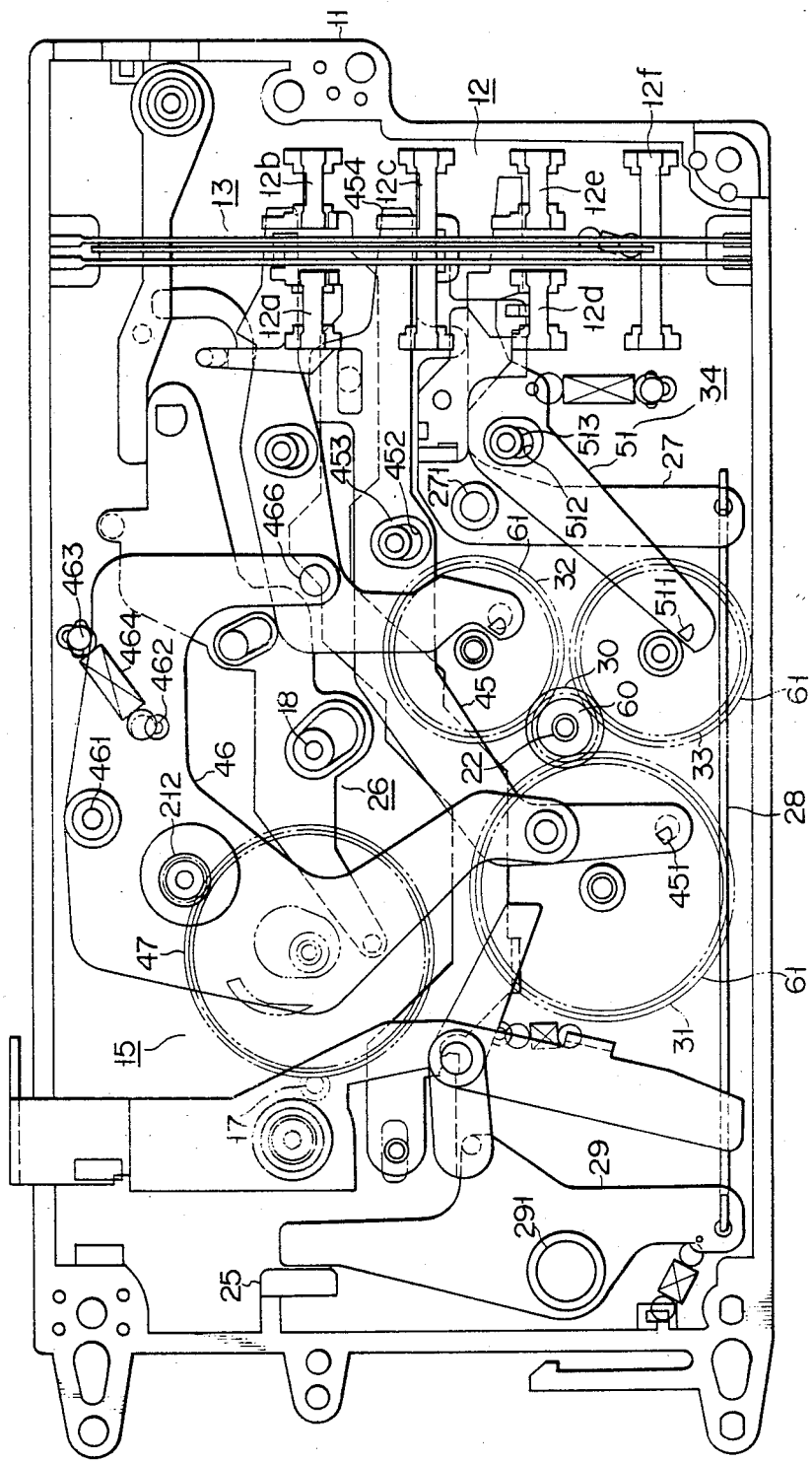

FIG. 2 shows a structural diagram showing the back surface side of the main chassis 11 through the main chassis 11 in the state shown in FIG. 1. In other words, a known automatic stopping mechanism, hereinafter referred to as "an ASO mechanism", 26 is installed with respect to the shaft 18 in addition to the mechanism 13 and the mechanism 15. An erroneous-erasure-preventing lever 27 of substantially L shape engaged with one end of the REC control 12d is rotatably supported on the shaft 271 projected at the corner from the main chassis 11. One end of a transmission lever 28 is connected to the other end of the lever 27. The other end of the lever 28 is connected to one end of an erroneous-erasure-preventing-detecting-lever 29 which is rotatably supported on the rotational shaft 291 projected substantially at the center from the main chassis 11. The other end of the lever 29 is capable of being connected to the lever 25. When the control 12d is pressed, the lever 27 is rotated counterclockwise in FIG. 2. Accordingly, the lever 29 is rotated through the lever 28. At this time, when an erroneous-erasure-preventing-pawl of the magnetic tape cassette (not shown) is not broken, and hence when the recorder/player is operated in the recording-enabled state, the lever 25 is pushed out by the erroneous-erasure-preventing-pawl of the cassette, the lever 25 is disposed at the position not facing the other end of the lever 29. Therefore, the lever 29 can sufficiently rotate counterclockwise in FIG. 2, and the control 12d is locked in the operating position. If the erroneous-erasure-preventing-pawl is broken, that is, when the recorder/player is operated in the recording inhibiting state, the lever 25 is disposed at the position facing the lever 29, and the rotation of the lever 29 is stopped, and so the control 12d cannot be operated, resulting in erroneous erasure prevention.

Then, a gear 30 is provided at the capstan 22 as the first rotor 60 which rotates integrally and coaxially with the capstan 22. Around the gear 30 are rotatably supported a constant speed feeding gear 31 as the second rotor 61, a high speed feeding gear 32 and a pausing gear 33. Partial notches (not shown) are respectively formed at the gears 31 through 33 so as not to engage the gear 30. In the normally stopped state, the notches of the gears 31 through 33 face the gear 30. Even when the gear 30 is rotated, the gears 31 through 33 are not rotated. When either the PLAY or REC controls 12c or 12d is operated, the gear 31 is engaged with the gear 30, and is thus rotated, the mechanism 15 is driven by the rotary force of the gear, thereby feeding the tape in the playback or recording state. When the REW or FF control 12a or 12b is operated, the gear 32 is engaged with the gear 30, and is rotated. Thus, the mechanism 14 is driven by the rotary force of the gear, thereby feeding the tape in the rewinding or fast feeding state. Further, when the PAUSE control 12e is operated, the gear 33 engages the gear 30, is rotated, and a PAUSE mechanism 34 as a magnetic tape recorder/player mechanism 63 (to be described later) provided at the lower right-side section in FIG. 2 of the main chassis 11, is driven by the gear, thereby temporarily stopping the tape.

Figure 3:
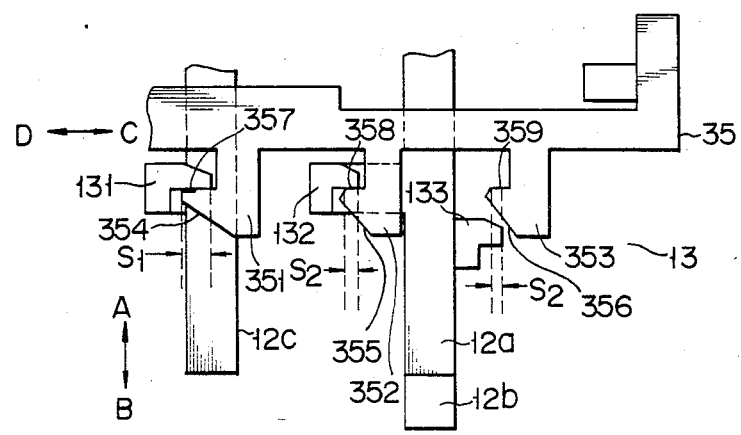
FIG. 3 is a side view showing a lock mechanism.

The overall construction of the cassette magnetic tape recorder/player of the invention has been described, and the detail structures and the operations of the respective sections of the recorder/player will now be described. FIG. 3 shows the lock mechanism 13. The PLAY, REW and FF controls 12c, 12a and 12b can be depressed in a direction of an arrow A in FIG. 3 and are urged in the resetting direction (arrow B) by a spring (not shown). A lock plate 35 is slidably supported in the directions of arrows C and D in FIG. 3 so as to cross substantially perpendicular to the PLAY, REW and FF controls 12c, 12a and 12b. The plate 35 is urged by a spring (not shown) in the direction of the arrow D.

At the sides of the controls 12c, 12a and 12b lock parts 131 through 133 are formed as shown in FIG. 3. At one side of the plate 35 connection parts 351 through 353 which are respectively connected to the lock parts 131 through 133 of the controls 12c, 12a and 12b are formed. The connecting parts 351 through 353 of the plate 35 have oblique parts 354 through 356, respectively enabling the operation (in a direction of the arrow A) of the controls 12c, 12a and 12b, and locking parts 357 through 359 for preventing the resetting (in a direction of the arrow B), with respect to the lock parts 131 through 133.

Therefore, when the control 12c is pressed in the direction of arrow A in FIG. 3 to, for example, switch from the stopping state to the playback state, the lock part 131 of the control 12c urges the oblique part 354 of the plate 35, and the plate 35 is slid in the direction of arrow C. When the lock part 131 exceeds the top of the oblique part 354, the plate 35 is slid in the direction of arrow D, the lock part 131 of the control 12c is locked to the lock part 357 of the plate 35, as shown in FIG. 3, and is locked in the operating position. When the control 12f is, for example, operated in the state that the control 12c is thus operated, or the ASO mechanism 26 is operated, the plate 35 is forcibly slid in the direction of arrow C in FIG. 3, part 357 is released from part 131, and the control 12c is reset to the original position. Further, as the above-described lock and lock-releasing operations of the controls are similar in the REW and FF controls 12a, 12b and 12d, they are not shown in FIG. 3, and their descriptions will be omitted.

As evident from FIG. 3, the engaging depth $S_1$ of the lock part 131 of control 12c and part 357 of plate 35 is set to be deeper than the engaging depth $S_2$ of the lock parts 132 and 133 of controls 12a and 12b and the lock parts 358 and 359 of plate 35, because this is necessary for an automatic playing operation.

Figure 4:
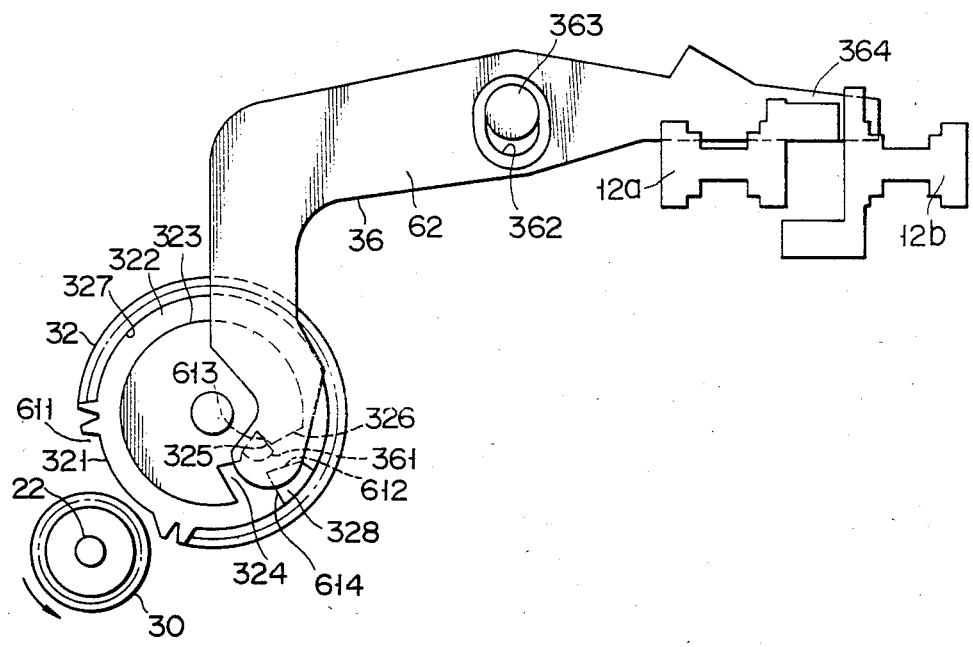
FIG. 4 is a plan view showing the essential part of this embodiment and showing the relevant sections of a high speed feeding gear and a high speed lock lever of a high speed feeding mechanism.

Now, the high speed feeding mechanism 14 will be described. As shown in FIG. 4, a notch 321 as a non-engaging part 611 which is not engaged with the gear 30 of the capstan 22 is formed at the gear 32. A guide groove 322 of substantially ring shape is formed along the circumference of one surface of the gear 32. A recess 324, recessed toward the central rotating direction of the gear 32, as shown, is formed at a part of an inner peripheral side wall 323 of the groove 322. When the gear 32 is eventually rotated clockwise in FIG. 4 and is engaged with the gear 30, which is rotated counterclockwise in FIG. 4, the wall surface of the recess 324 becoming the rear direction with respect to the rotating direction (clockwise in FIG. 4) is formed continuously with a first part 325 as a stopping part 613 substantially perpendicular to the rotating direction, and a second part 326 connected to the inner peripheral side wall 323, oblique with respect to the rotating direction. A projection 328 as the guide 612 and the engaging part 614 is formed at the part facing the recess 324 of the outer peripheral side wall 327 of the groove 322.

An engaging part 361 projected from one end of a high speed lock lever 36 of substantially L shape as a lock member 62 is movably engaged within the guide 322 of the gear 32. The bottom of the recess 324 of the groove 322 and the part facing the first part 325 are formed flat, and the part facing the projection 328 are bent substantially in a sector shape at the projection 361. A long hole 362 is formed longitudinally in FIG. 4 substantially at the center between the corner and the other end of the lever 36, and a rotational shaft 363 projected from the main chassis 11 is movably engaged within the long hole 362, and is rotatably supported. The other end of the lever 36 is formed as the engaging part 364 to be engaged with the controls 12a and 12b.

Figure 5:
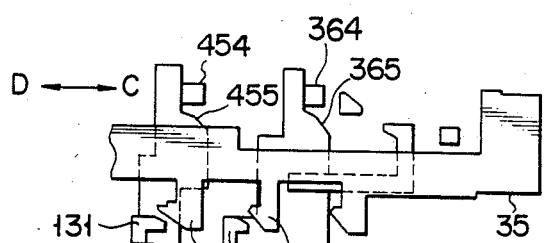
FIG. 5 is a side view showing the relevant section of respective control switches and high and constant speed lock levers.

FIG. 5 shows the engaging relationship between the lever 36 and the control 12a. The engaging part 364 of the lever 36 is disposed at the upper side section in FIG. 5 of the control 12a. At the side part facing the engaging part 364 of the control 12a an oblique part 365 is formed which can move the engaging part 364 of the lever 36 in the direction of arrow C, that is, which can rotate the lever 36 counterclockwise in FIG. 5 when the control 12a is pressed in the direction of arrow A in FIG. 5.

An urging force is applied by a spring (not shown) to the lever 36 to move the engaging part 364 of the lever 36 in the direction of arrow D in FIG. 5 and which can rotate the lever 36 clockwise in FIG. 4. The lever 36 is rotated by the spring clockwise in FIG. 4 until the projection 361 contacts the bottom of the recess 324 of the gear 32. As shown in FIG. 4, the notch 321 of the gear 32 faces the gear 30 of the capstan 22 so as not to be rotated in such a way that the projection 361 of the lever 36 will contact the bottom of the recess 324 of the gear 32 and the first part 325.

Figure 6:
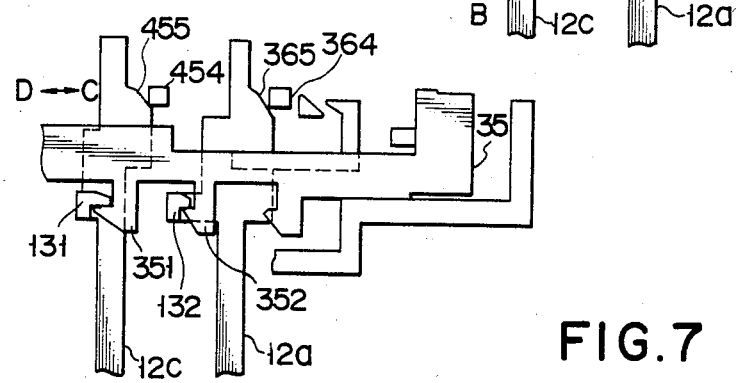
FIG. 6 is a side view showing the state in which the respective control switches are operated in FIG. 5.
Figure 7:
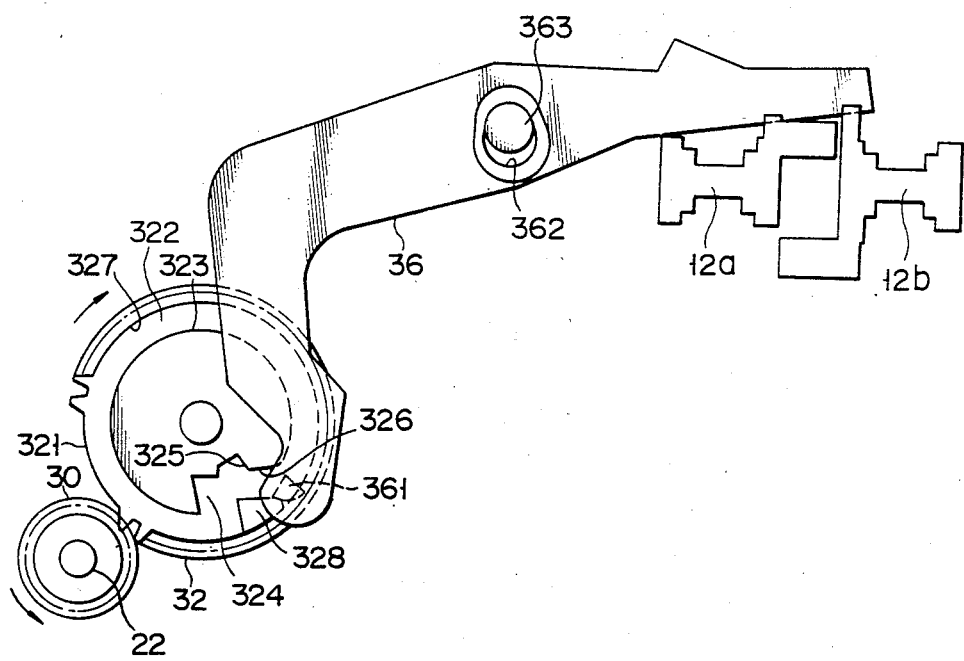
FIG. 7 and FIG. 8 are plan views for describing the operations of the high speed feeding gear and the high speed lock lever shown in FIG. 4.

When the control 12a is depressed in the direction of arrow A so that the lock part 132 is locked to the part 352 of the lock plate 35, as shown in FIG. 6, the lever 36 is moved at the part 364 against the urging force of the spring in the direction of arrow C in FIG. 6 by the oblique part 365 of the control 12a. Accordingly, the lever 36 is finally rotated counterclockwise as shown in FIG. 7. Then, the projection 361 of the lever 36 is separated from the bottom of the recess 324 and from the first part 325, and the bent part of the projection 361 urges the projection 328 of the gear 32. Consequently, the gear 32 is rotated slightly clockwise in FIG. 7, and is engaged with the gear 30.

Figure 8:
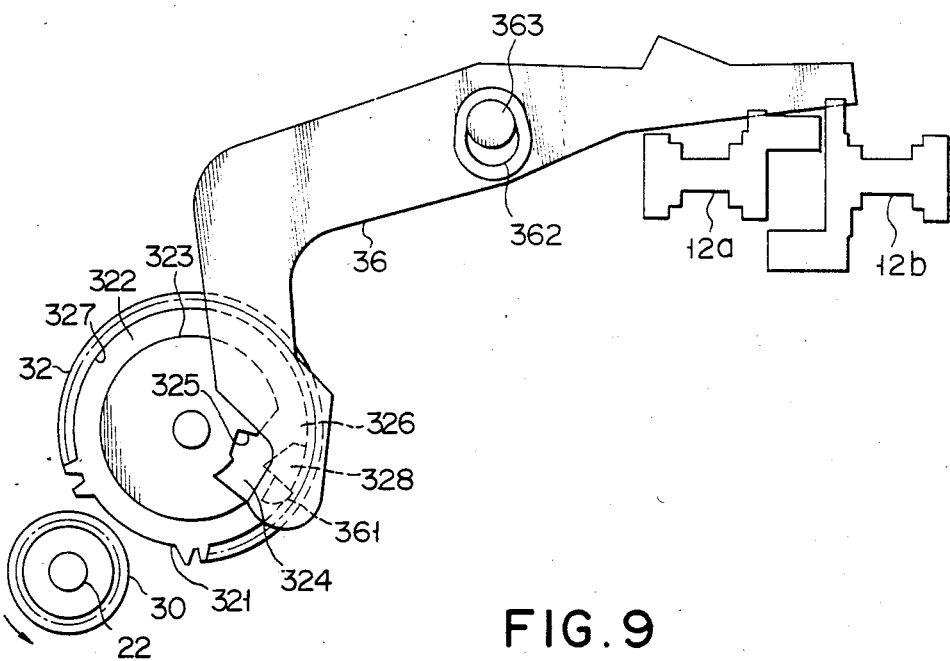

Thus, the gear 32 is driven clockwise in FIG. 7 by the rotary force of the gear 30. As shown in FIG. 8, the gear 32 is rotated substantially in one revolution, and the notch 321 faces the gear 30 such that the projection 328 contacts the projection 361 of the lever 36, and the rotation stops. Then, the mechanism 14 is driven, as will be described by the rotary force of the gear 32 rotating substantially in one revolution from the position shown in FIG. 7 to the position shown in FIG. 8, and the recorder/player begins tape rewinding.

Since the control 12a is locked at the operating position, the lever 36 is in the position shown in FIG. 8, as evident from FIG. 6, and the gear 32 is disposed as will be described later in the state shown in FIG. 8, and is urged clockwise by the reaction when the mechanism 14 is in the driving state. Accordingly, the projection 328 contacts the projection 361 under pressure. Thus, the gear 32 and the lever 36 are eventually stabilized at the position shown in FIG. 8 in the tape rewinding state.

When the control 12f is operated and the control 12a is reset to the original position as shown in FIG. 5 in the above tape rewinding state, the lever 36 is rotated clockwise by the tension of the spring from the position shown in FIG. 8, returns to the position shown in FIG. 4, the mechanism 14 returns to the non-driven state, and the tape stops feeding.

The operation of the recorder/player when the control 12a was operated has been described, and this can be similarly described for the operation of the control 12b. In other words, the relationship between the control 12b and the part 364 of the lever 36 is the same as shown in FIG. 5. When the control 12b is operated such that the lever 36 is disposed at the position shown in FIG. 4, the lever 36 becomes as shown in FIG. 7. When the gear 32 is rotated substantially one revolution and becomes as shown in FIG. 8, the mechanism 14 is driven, and the recorder/player begins fast feeding the tape.

When the control 12f is operated, the lever 36 is returned from the position shown in FIG. 8 to the position shown in FIG. 4, and the feeding is stopped.

More particularly, the gear 32 is rotated substantially one revolution cooperatively with the tape fast feeding control such as the controls 12a, 12b, and the mechanism 14 is driven.

Figure 9:
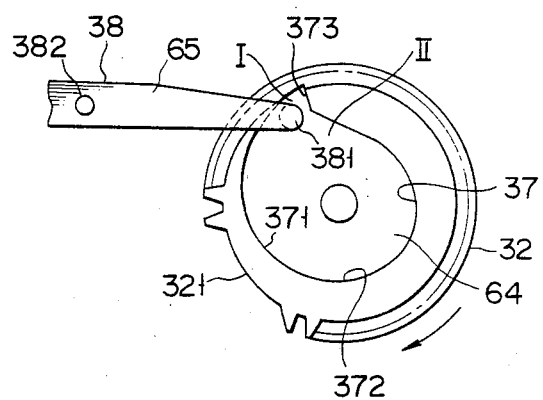
FIG. 9 is a structural diagram showing the inner cam of the high speed feeding gear.

An inner cam 37 as a cam 64 is formed at the surface opposite to the surface formed with the groove 322 of the gear 32 as shown in FIG. 9. This cam 37 is formed of a cam part 372 formed substantially spirally around the rotating center of the gear 32, and a releasing part 373 radially connected to the gear 32 at both ends of the cam parts 372. The cam part 372 is formed spirally with respect to the clockwise rotation in FIG. 9 of the gear 32 by increasing the diameter larger than the rear part from the front part. A projection 381 formed at one end of a high speed drive lever 38 is movably engaged as a drive member 65 in the cam 37. This lever 38 is engaged substantially at the center with the rotational shaft 382 projected from the main chassis 11, and is rotatably supported. The lever 38 shown in FIG. 9 is simplified for the convenience of description from the actual high speed drive lever to be described later, but has entirely the same function, and the actual high speed drive lever shown in the following drawings has the same reference numerals for the same parts.

The lever 38 is urged counterclockwise in FIG. 9 by a spring (not shown), and is rotated until the projection 381 contacts the peripheral wall 371 of the cam 37. The projection 381 of the lever 38 is disposed at the connecting part of the releasing part 373 of the cam 37 and the large-diameter part of the cam part 372 and, hence, the part I in FIG. 9 in which the projection 361 of the lever 36 contacts the bottom of the recess 324 and the first part 325 as shown in FIG. 4. When the gear 32 is engaged with the gear 30 as described above and is rotated clockwise in FIG. 9, the lever 38 is sequentially urged against the tension of the spring by the cam 372 at the projection 381. Accordingly, the lever 38 is eventually rotated clockwise in FIG. 9. In this manner, the gear 32 is rotated substantially one revolution, and when the projection 328 contacts the projection 361 of the lever 36, as shown in FIG. 8, the lever 38 is disposed at the projection 381 at the nearest position to the releasing part 373 of the small-diameter part of the cam 372 of the cam 37, and hence, at the part II in FIG. 9, and is maintained in the state rotated to the most clockwise position in FIG. 9. Since the urging force of the counterclockwise direction in FIG. 9 is applied to the lever 38 at this time, the projection 381 urges the cam part 372 of the part II in FIG. 9. Therefore, the gear 32 is urged clockwise in FIG. 9, and the projection 328 of the gear 32 is urged to the projection 361 of the lever 36 in the state shown in FIG. 8 as described above.

Then, when the lever 36 is rotated clockwise from the state shown in FIG. 8, and becomes as shown in FIG. 4, the gear 32 is rotated clockwise in FIG. 9 by the urging force when the projection 381 of the lever 38 previously urges the cam part 372 of the part II in FIG. 9 in the state that the projection 361 of the lever 36 is released from the projection 328 of the gear 32. Consequently, the projection 381 of the lever 38 is moved from part II to part I in FIG. 9, and the lever 38 is reset to the original position. At this time, since the projection 361 of the lever 36 is instantaneously introduced into the bottom of the recess 324 of the gear 32, the clockwise rotation in FIG. 9 of the gear 32 due to the urging force of the lever 38 is stopped by the projection 361 of the lever 36 contacting the first part 325, and is returned to the original state.

A notch 383 of substantially rectangular shape is formed from the lower part to the upper part of the end opposite to the side formed with the projection 381 of the lever 38. In the notch 383 a projection 391 of substantially cylindrical shape projected from one end of the lever 39 is movably engaged. A projection 384 of substantially cylindrical shape and a connecting piece 385 are respectively formed at the end formed with the notch 383 of the lever 38 and at the upper part in FIG. 10 of the projection 384. The projection 391 of the lever 39 is engaged at one end with the connecting piece 385 of the lever 38, and is engaged at the other end with the upper part in FIG. 10 by a torsion spring 386 engaged with the projection 391 around the projection 384 and is maintained in this state.

Figure 10:
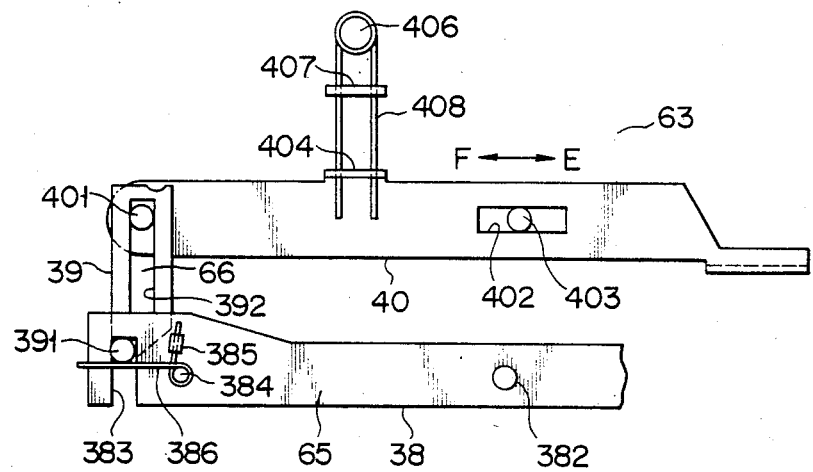
FIG. 10 is a plan view showing the fast feed and rewind switching mechanism of the high speed feeding mechanism.
Figure 11:
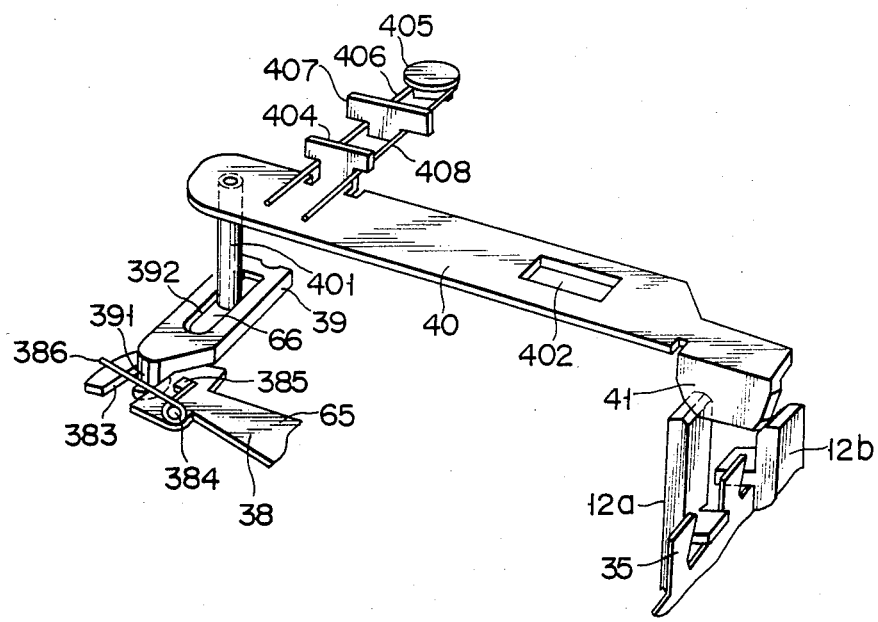
FIG. 11 is a perspective view showing details of the torsion spring part shown in FIG. 10.

A long hole 393 is longitudinally formed as a movably engaging part 66 at the lever 39. In the hole 392 is movably engaged a projection 401 projected from one end of a high speed switching slider 40. This slider 40 is installed substantially parallel to the lever 38, a projection 403 projected from the main chassis 11 is movably engaged with a long hole 402 longitudinally formed substantially at the center, and is slidably supported in a direction of arrows E and F in FIG. 10. A cut and erected piece 404 of substantially T shape at the front is formed as shown in FIG. 11 at the upper side section of the slider 40 in FIG. 10. A projection 406 having a collar 405 of substantially cylindrical shape at the top is projected from the main chassis 11 facing the piece 404. A cut and erected part 407 of substantially the same shape as piece 404 is formed on the main chassis 11 between piece 404 of the slider 40 and the projection 406. Both sides of the bases of the pieces 407 and 404 are interposed at both ends of a torsion spring 408 wound at the center on the projection 406. In this manner, the slider 40 is maintained at the neutral position (at the position shown in FIG. 10) at the positions of both ends of the spring 408 normally defined by the piece 407.

Figure 12A:
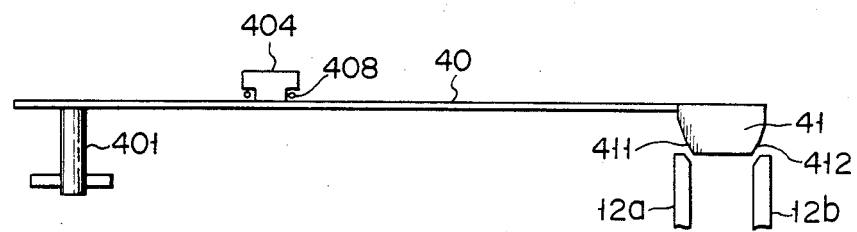
FIG. 12A to FIG. 12C are structural diagrams showing the structure and the operating state of the high speed switching slider.

The end opposite to the side formed with the projection 401 of the slider 40 is extended to the position facing the controls 12a, 12b, and a bent control piece 41 is formed at the side as shown in FIG. 11. This piece 41 is formed with oblique parts 411 and 412 at both sides as shown in FIG. 12A. The ends of the controls 12a and 12b are faced with the parts 411 and 412.

Figure 12B:
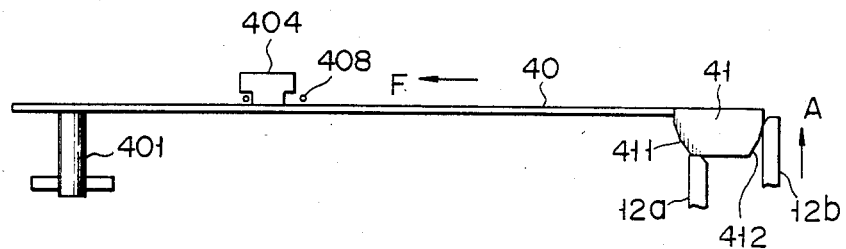
Figure 12C:
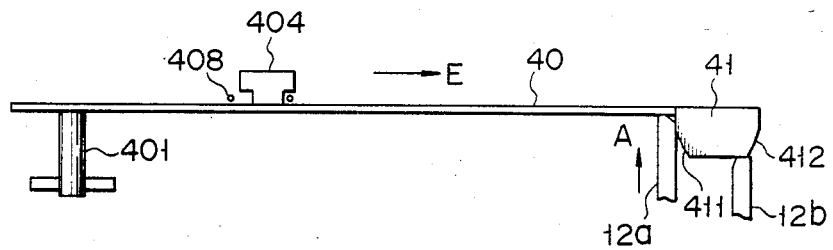

When the control 12b is operated in the direction of arrow A, as shown in FIG. 12B, the end of the control 12b urges the part 412 of the piece 41, and the slider 40 is slid against the urging force of the spring 408 in the direction of arrow F, as shown. As shown in FIG. 12C, when the control 12a is operated in the direction of arrow A, the end is slid in the direction of arrow E against the urging force of the spring 408.

Figure 13A:
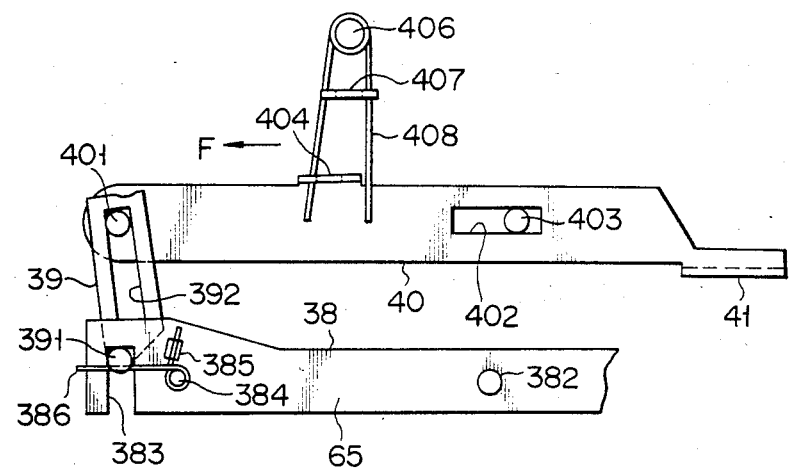
FIGS. 13A, 13B, 14A and 14B are structural diagrams showing the operating states shown in FIG. 10.
Figure 13B:
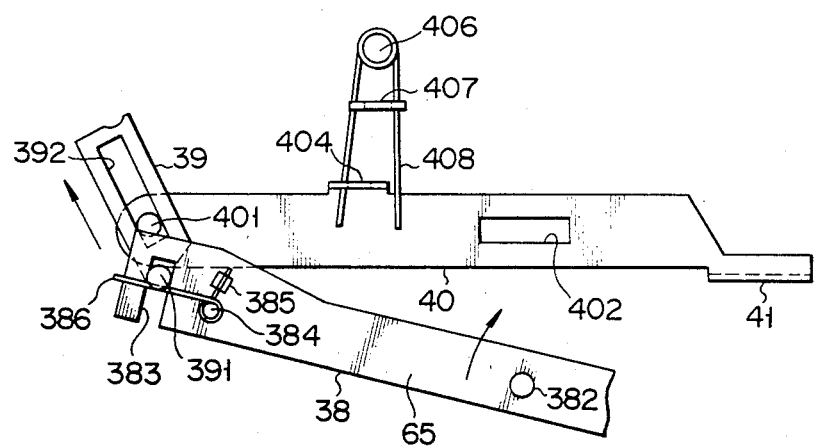

It is assumed that the control 12b is operated as shown in FIG. 12B, and the slider 40 is slid in a direction of arrow F. Then, as shown in FIG. 13A, the lever 39 is rotated counterclockwise in FIG. 12A from the position shown in FIG. 10, with the projection 391 as a center, by the projection 401 of the slider 40. Since the control 12b is operated at this time, as previously described with respect to FIGS. 7 through 9, the lever 38 is rotated clockwise as shown in FIG. 13B. In this manner, the projection 391 of the lever 39 is urged by the spring 386, and the lever 39 is rotated counterclockwise around the projection 401 of the slider 40 while moving upwardly in FIG. 13B. When the lever 39 is thus disposed as shown in FIG. 13B, the high speed transmission mechanism 67 (to be described later) is controlled to the state corresponding to the tape fast feeding state.

Figure 14A:
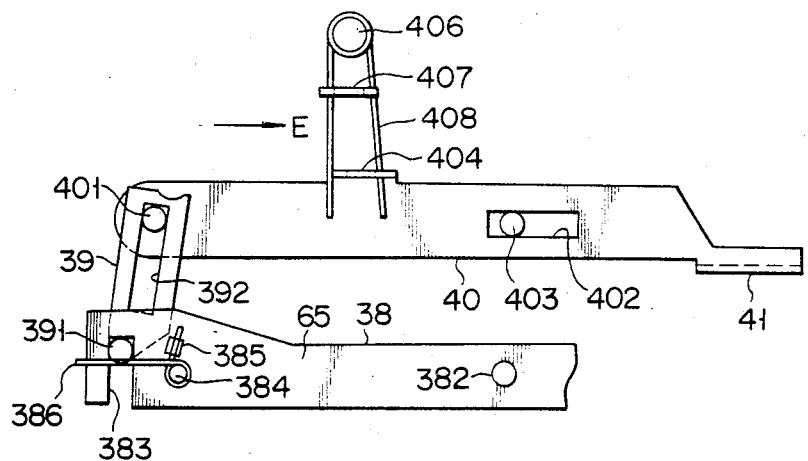
Figure 14B:
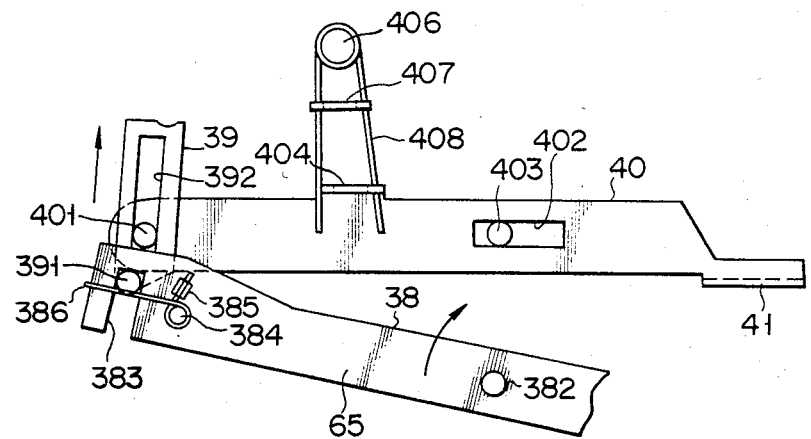

It is assumed that, as shown in FIG. 12C, the control 12a is operated and the slider 40 is slid in the direction of arrow E. As shown in FIG. 14A, the projection 391 of the lever 39 is slightly rotated clockwise in FIG. 14A from the position shown previously in FIG. 10 around the projection 391 by the projection 401 of the slider 40. Further, since the control 12a is operated at this time, as described previously with respect to FIGS. 7 through 9, the lever 38 is rotated clockwise as shown in FIG. 14B. Accordingly, the projection 391 of the lever 39 is urged by the spring 386, and the lever 39 is urged substantially upwards as shown in FIG. 14B, and the lever 39 is then disposed at the position as shown in FIG. 14B. Thus, the mechanism 67 is controlled to the state corresponding to the tape rewinding state.

Figure 15:
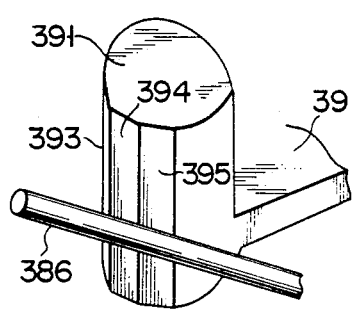
FIG. 15 and FIGS. 16A to 16C are perspective views showing the details of the projection shown in FIG. 11 and a structural diagram showing the operating state of the projection.
Figure 16A:
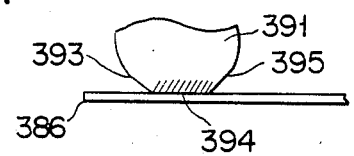
Figure 16B:
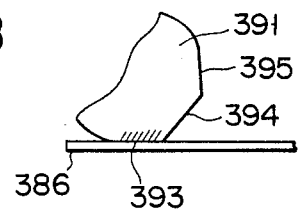
Figure 16C:
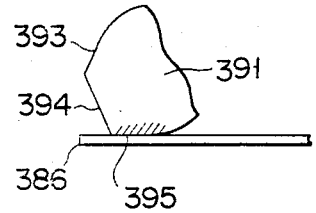

Three flat parts 393 through 395 are formed as shown in FIG. 15 at the part facing the spring 386 of the projection 391 of the lever 39. When the lever 39 is disposed in the neutral state as shown in FIG. 10, the central part 394 contacts the spring 386. When the lever 39 is disposed in the state as shown in FIGS. 13B and 14B, the parts 393 and 395 respectively contact the springs 386 as shown in FIGS. 16B and 16C. Thus, the lever 39 is stably disposed at the position shown in FIGS. 13B and 14B.

Figure 17:
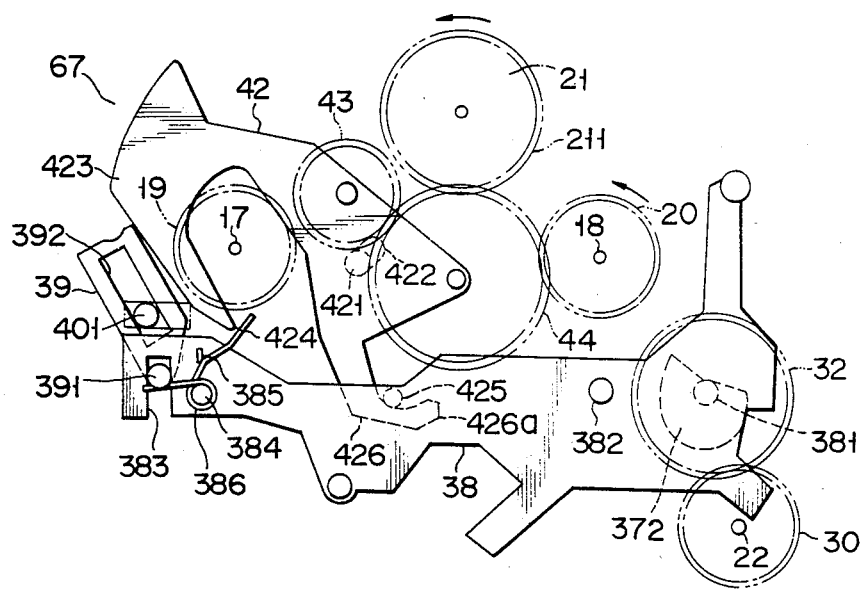
FIG. 17 is a plan view showing the high speed transmission mechanism of the high speed feeding mechanism.
Figure 18:
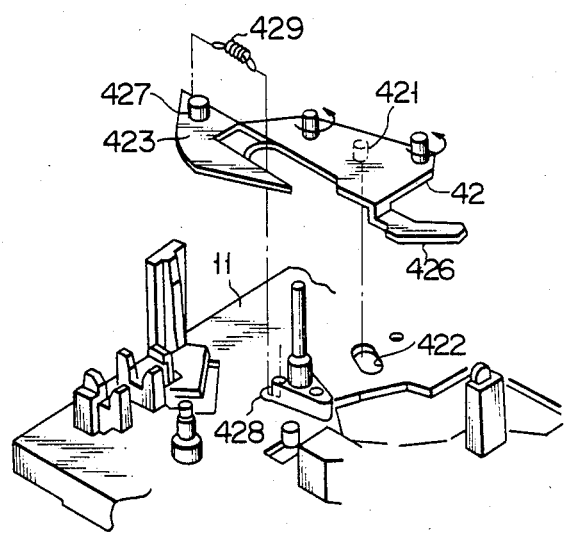
FIG. 18 is an exploded perspective view showing the high speed feeding mechanism partly expanded.

The mechanism 67b will now be described. As shown in FIG. 17, a high speed lever 42 having a shape as shown is provided between the shafts 17 and 18. This lever 42 is rotatably supported, as shown in FIG. 18, in such a manner that a pin 421 projected substantially at the center is movably engaged with a long hole 422 formed at the main chassis 11. A gear 43 of small diameter and a gear 44 of large diameter are rotatably supported substantially at the center of the lever 42 as shown in the lower part in FIG. 17. The gear 44 is not seen in FIG. 17, but the gears of substantially equal diameter are formed to be integrally rotated coaxially. One of the gears 44 is always engaged with the gear 43. The other of the gears 44 is engaged with the first gear 211 of the gear 21 and the gear 20 of the shaft 18 in the state rotated counterclockwise in FIG. 17, and is engaged with the gear 19 of the shaft 17 in the state rotated clockwise in FIG. 17. Further, the gear 43 is engaged with the first gear 211 of the gear 21 in the state rotated clockwise in FIG. 17. The gear engaged with the gear 43 of the two gears 44 has fewer teeth than the other gear.

A bent part 423 in a substantially U shape is formed at the upper part of the lever 42 as shown in FIG. 17. The end 424 of the bent part 423 faces the upper end of the lever 39 when the lever 38 is stopped as shown in FIG. 10. A control part 426 engaged with the pin 425 projected substantially at the center of the lever 38 in a substantially L shape is extended at the lower part of the lever 42. The lever 42 is engaged with a coiled spring 429 between the pin 427 projected from the bent part 423 and a through hole 428 formed at the main chassis 11, and is urged counterclockwise in FIG. 17. The spring 429 of the lever 42 is rotated until the end 426a of the part 426 contacts the pin 425 of the lever 38 when the lever 38 is stopped, as shown in FIG. 10. When the lever 42 is disposed at this position, the gears 43 and 44 are not engaged with the first gear 211 of the gear 21, or the gears 19 and 20 of the shafts 17 and 18.

When the control 12b is operated in this state, the lever 38 is moved to the position shown in FIG. 13. Thus, the pin 425 contacting the end 426a of the part 426 is released from the end 426a, and is moved to the inside of the control part 426. Since the lever 39 is rotated counterclockwise in FIG. 13B at this time, the lever is disposed at the position not facing the end 424 of the lever 42. Accordingly, the lever 42 is rotated counterclockwise in FIG. 17 to hold the pin 425 with the part 426 as shown in FIG. 17.

Accordingly, the gear engaged with the gear 43 of the gear 44 is engaged with the first gear 211 of the gear 21, and the other gear is engaged with the gear 20 of the shaft 18. Then, the gear 21 is driven counterclockwise in FIG. 17, and the rotary force is transmitted through the gears 44 and 20 to the shaft 18, and the shaft 18 is rotated counterclockwise in FIG. 17, thereby performing the fast feeding of the tape.

Figure 19:
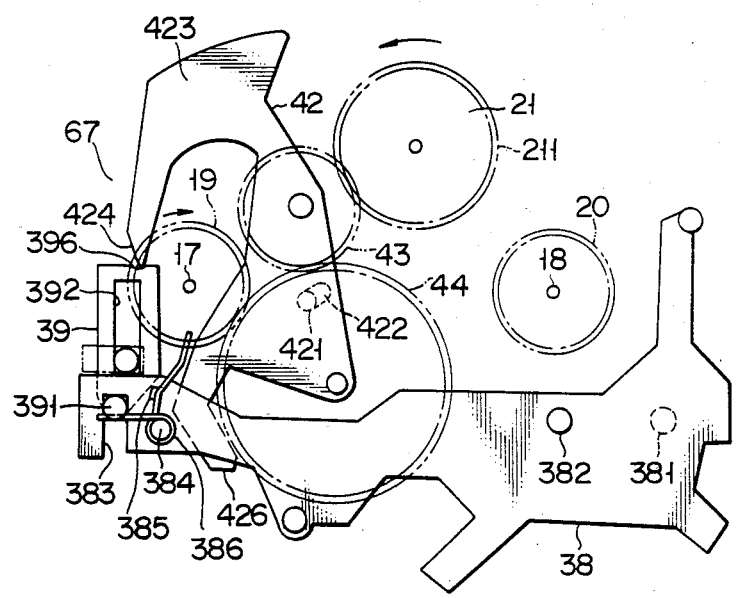
FIG. 19 is a structural diagram showing the operating state of the high speed transmission mechanism shown in FIG. 17.

When the control 12a is operated, the lever 39 is moved to the upper part in FIG. 14B. Thus, as shown in FIG. 19, the recess 39b formed at the upper end of the lever 39 urges the end 424 of the lever 42, thereby rotating the lever 42 clockwise in FIG. 19. Consequently, the gear 43 is engaged with the first gear 211 of the gear 21, and the other of the gears 44 is engaged with the gear 19 of the shaft 17. Then, the rotary force of the gear 21 rotated counterclockwise in FIG. 19 is transmitted through the gears 43, 44 and 19 to the shaft 17, and the shaft 17 is rotated clockwise in FIG. 19, thereby performing tape rewinding.

Therefore, according to the above-described mechanism 14, as described previously with respect to FIG. 7, the projection 361 of the lever 36 which is rotated counterclockwise in FIG. 7 urges the projection 328 of the gear 32 in the state that the controls 12a and 12b are operated, and the gear 32 is rotated clockwise in FIG. 7. In this manner, a bias mechanism for rotating the gear 32 in one direction can be eliminated, thereby simplifying the structure. In other words, in the mechanism of the conventional type, when the high speed feeding gear is locked by the high speed lock lever and the notch of the gear faces the gear of the capstan, the rotating force is applied, for example, by a leaf spring to the high speed feeding gear in one direction, and when the lock of the high speed lock lever is released (i.e., when the high speed tape feeding control switch is operated), the high speed feeding gear is slightly rotated by the urging force of the leaf spring, and engages the gear of the capstan. Accordingly, the leaf spring and its supporting members are necessary, thereby complicating the structure and the number of assembling steps, and increasing the size of the magnetic tape recorder/player.

However, according to the mechanism 14 as described above according to this invention, it is not necessary to apply any bias to the gear 32. Accordingly, the magnetic tape recorder/player can be constructed simply and can also be assembled readily, thereby reducing its size. Further, when the projection 328 of the gear 32 is formed by molding dies with synthetic resin material, it can be readily formed. In addition, because the gear 32 does not require a bias mechanism such as a leaf spring, as does the conventional recorder/player, the following advantages can be provided. That is, in a case where the controls 12a and 12b are operated when the motor is not rotated, for example, due to power interruption or a decrease in battery power (the capstan 22 is stopped), the gear 32 becomes engaged with the gear 30 as shown in FIG. 7, but when the control 12f is operated, the lever 36 is rotated clockwise in FIG. 7 and is returned to the original position, whereupon the projection 361 urgs the second part 326 of the recess 324, causing the gear 32 to be rotated counterclockwise in FIG. 7, and the gear 32 is returned to the stopped position as shown in FIG. 4. Consequently, even if the power interruption stops or the battery is replaced, no error will occur.

When the tape high speed feeding control is, for example, operated during a power interruption time in the conventional magnetic tape recorder/player which employs the prior art bias mechanism, the high speed feeding gear is slightly engaged with the gear of the capstan by the above bias, and when the STOP control is then operated, the high speed feeding control is returned to the original position, but the high speed feeding gear is not returned to the stopping position. Thus, when the power interruption ends and the motor is rotated, even if the control is disposed at the stopped position, the high speed feeding gear is rotated erroneously. On the other hand, according to the invention with the structure described above, erroneous operation can be effectively prevented with an extremely simple structure.

Since the projection 381 of the lever 38 urges the cam part 372 of the part II in FIG. 9 as described with respect to FIG. 9, the gear 32 is urged clockwise in FIG. 9. Then, when the STOP control 12f is operated, the projection 361 of the lever 36 contacts the first part 325 of the recess 324 of the gear 32, the rotation due to the urging force of the lever 38 of the gear 32 can be prevented. Accordingly, an erroneous operation to cause the gear 32 to be excessively rotated and to be again engaged with the gear 30 can be effectively prevented.

Figure 20:
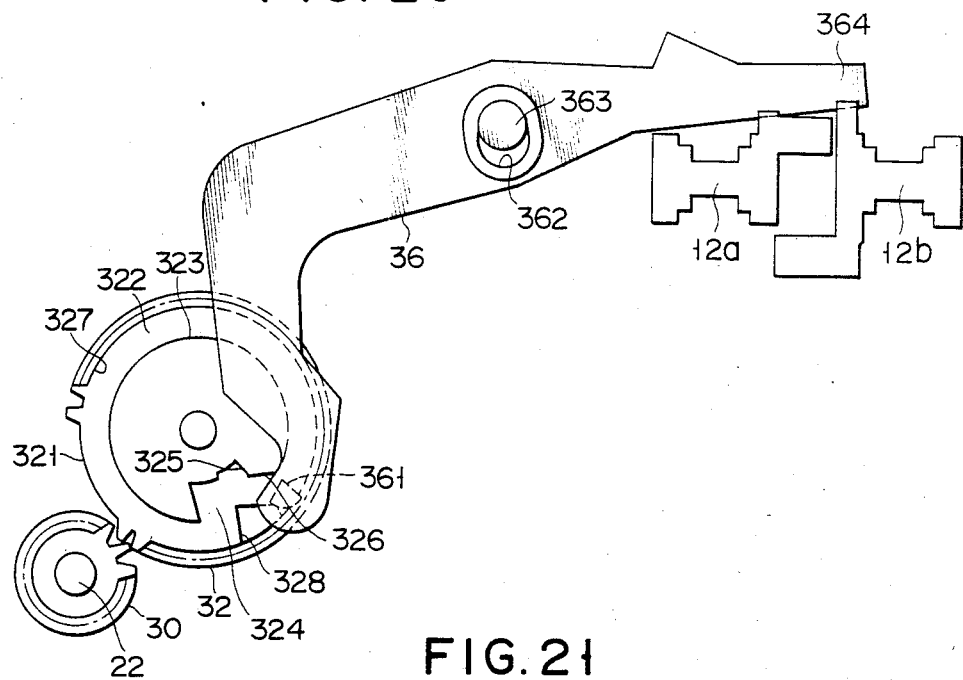
FIG. 20 and FIG. 21 are plan views for describing the operation of a long hole formed on the high speed lock lever.
Figure 21:
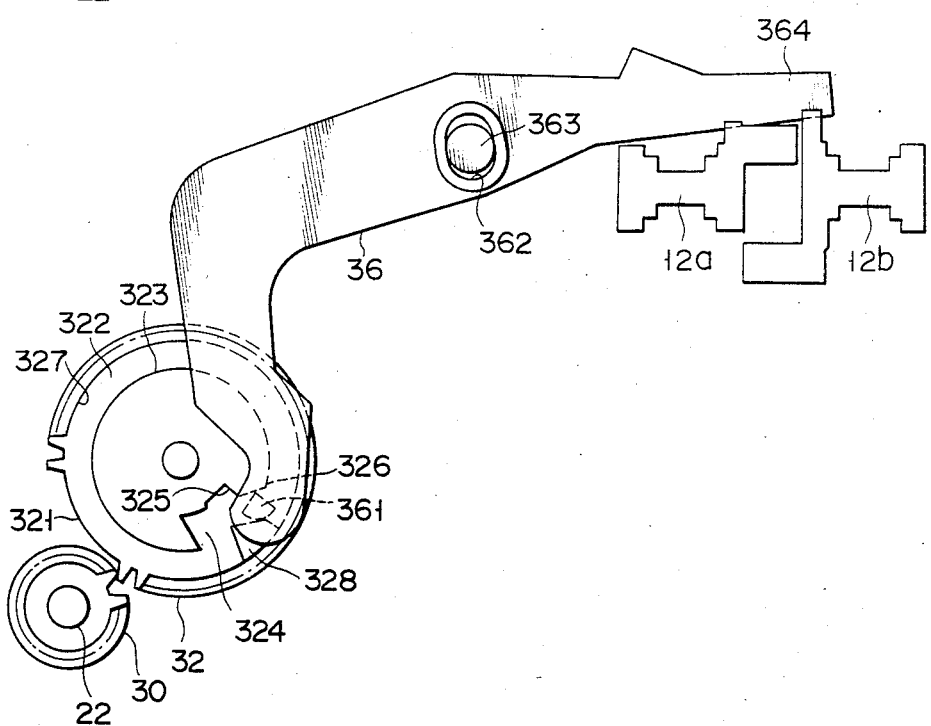

Then, the lever 36 is movably engaged with the shaft 363 at the hole 362. Accordingly, as shown in FIG. 20, in the state that the gear 32 and the gear 30 can be completely engaged, the lever 36 is disposed with the shaft 363 at the upper part of the long hole 362 in FIG. 20. As shown in FIG. 21, the gear 32 and the gear 30 may not be engaged completely, but are contacted at the ends of the teeth, or the gears are contacted at the end of the gears at the time of stopping the rotation of the gear 30 due to the power interruption. In this case, the rotation of the gear 32 is temporarily stopped. However, since the controls 12a and 12b are operated, the lever 36 is sufficiently rotated counterclockwise in FIG. 21. Consequently, unreasonable force is applied to the lever 36. At this time, as shown in FIG. 21, the lever 36 is released through the long hole 362, thereby preventing damage to the lever 36 and the gear 32, and the engagement of the gear 32 with the gear 30 is smoothly performed, thereby preventing erroneous operation.

When the controls 12b and 12a are operated, the amount of the rotation of the lever 39 to the position shown in FIG. 13A or FIG. 14A through the slider 40 is small, but when the projection 391 of the lever 39 approaches the projection 401 of the slider 40, as shown in FIG. 13B or FIG. 14B, the slider 39 can be sufficiently moved. In other words, even if the operating strokes of the controls 12a and 12b are short, the moving distance of the lever 39 can be lengthened, the soft touch operation can be adapted, and the structure can be integrally formed for effective operation.

Since the ends of the controls 12a and 12b respectively face the oblique parts 411 and 412 of the slider 40, as shown in FIG. 12A, when the controls 12a and 12b are simultaneously operated, both the ends contact the parts 411 and 412, and hence, are interposed at the bent control piece 41 of the slider 40. Accordingly, it is impossible to operate both the controls 12a and 12b, and so-called "simultaneous depression" can be prevented. As shown in FIGS. 12B and 12C, when the controls 12b and 12a are individually operated, other controls 12a and 12b are not operated by the piece 41, thereby preventing erroneous operation.

As shown in FIG. 18, the pin 412 of the lever 42 is movably engaged with the long hole 422 of the main chassis 11. Accordingly, as shown in FIG. 18, when the lever 42 is rotated and the gear 44 is engaged with the gear 19 of the shaft 17, if the ends of the gears 44 and 19 are contacted, the lever 42 is urged upwardly in FIG. 19 along the long hole 422, thereby preventing unreasonable force from being applied to the lever 42 and the gears 44 and 19.

Now, the constant speed feeding mechanism 15 will be described. The constant speed feeding gear 31 is not shown in FIG. 2, but although it is different in diameter from the gear 32, it is constructed in the same manner as the gear 32. In other words, those parts corresponding to the guide groove 322, the recess 324, the first and second parts 325 and 326, and the projection 328 formed at the gear 32 are formed at one surface of the gear 31, those parts corresponding to the inner cam 37, the cam 372 and the releasing part 373 are formed at the other surface of the gear 31, and a notch corresponding to the notch 321 is also formed at the part of the gear 31. The engaging projection 45 formed at one end of the lever 45 shown in FIG. 2 is movably engaged within the guide groove of the gear 31. A rotational shaft 453 projected from the main chassis 11 is movably engaged rotatably within the long hole 452 formed substantially at the center of the lever 45. The other end of the lever 45 is extended to the side of the control 12c, and the engaging part 454 engaging with the control 12c as shown in FIG. 5 is formed.

More particularly, in FIG. 5, the upper side of the control 12c is formed with an oblique part 455 which can rotate the lever 45 in the direction of arrow C, and hence, counterclockwise in FIG. 2 in such state that the control 12c is operated in the direction of arrow A. As shown in FIG. 6, when the control 12c is locked at the operating position, the engaging part 454 of the lever 45 is urged by the part 455 and is moved in the direction of arrow C in FIG. 6, whereupon the part 451 of the lever 45 is released from the recess of the gear 31, the gear 31 is engaged with the gear 30 and is rotated.

In FIG. 2, a constant speed lever 46 of substantially U shape is provided substantially at the center of the main chassis 11. This lever 46 is engaged with the rotational shaft 461 projected from the chassis 11 (at the upper part in FIG. 2), and is rotatably supported. The second gear 211 of the large diameter gear 21 and a gear 47, normally engaged with the gear 211, are rotatably supported at one arm of the lever 46. Since a coiled spring 464 is engaged between the through hole 462 formed at the other arm and the projection 463 projected from the chassis 11, the lever 46 is urged counterclockwise in FIG. 2. The lever 46 is rotated in a counterclockwise direction (FIG. 2) until the gear 47 engages with the gear 48 which is coaxial with and put in a frictional contact with the shaft 18 as shown in FIG. 22.

Figure 22:
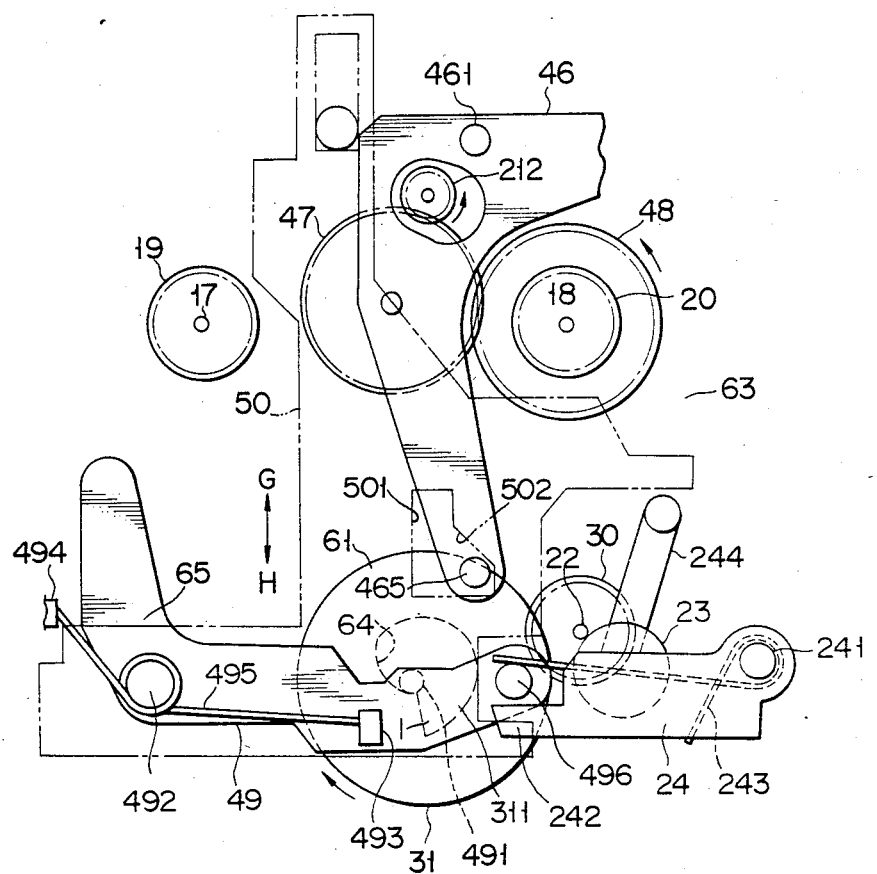
FIG. 22 is a plan view showing the constant speed feeding mechanism.

An inner cam 311 shown by a broken line in FIG. 22 is formed at the gear 31 as a cam part 64. A pin 491 projected from one end of the lever 49 is movably engaged as a drive member 65 in the cam 311. This lever 49 is rotatably supported in such a manner as to be engaged with a rotational shaft 492 projected at the corner from the chassis 11 in a substantially L shape. Then, the lever 49 is urged clockwise in FIG. 22 by a torsion spring 494 which is engaged at one end with the engaging piece 493 formed at one part of the lever 49 and which is engaged at the other end with the engaging part 494 formed at the chassis 11 around the shaft 492, and is rotated until the pin 491 contacts the cam 311 of the gear 31.

A projection 496 is formed at one end of the lever 49. The projection 496 is interposed between the extension part 242 projected from the end of the lever 24 and one end of the torsion spring 243 wound on the shaft 241 of the lever 24 and engaged with the lever 24 at both ends.

A head chassis 50 shown by two-dotted chain lines in FIG. 22 is interlocked with the lever 49 by a spring (not shown). In other words, the head chassis 50 carriers a recording/playback head and an erasing head (not shown) at predetermined positions, and is supported slidably in the direction of arrows G and H in FIG. 22. When the lever 49 is rotated counterclockwise and clockwise in FIG. 22, the head chassis is slid in the direction of the arrows G and H. A control hole 501 is formed substantially at the center of the chassis 50, and a projection 465 projected from one arm end of the lever 46 is movably engaged with the hole 501. When the head chassis 50 is slid in the direction of the arrow H in FIG. 22, the projection 465 of the lever 46 is engaged with the hole 501 of the chassis 50, the lever 46 is rotated clockwise in FIG. 22 against the urging force of the spring 464 (FIG. 2), and an oblique part 502 for isolating the gear 47 from the gear 48 is formed.

Since the pin 491 of the lever 49 is disposed at the part of large diameter of the cam 311 of the gear 31 (at the part I in FIG. 22) in the stopped state at this time, the lever 49 is disposed at the position rotated clockwise from the position shown in FIG. 22, whereupon the chassis 50 is disposed in the direction of arrow H. Accordingly, the recording/playback head and the erasing head are isolated from the tape, the gear 47 is isolated from the gear 48, and since the projection 496 of the lever 49 urges the lower part in FIG. 22 of the extension part 242 of the lever 24, the lever 24 is rotated counterclockwise in FIG. 22, the roller 23 is isolated from the capstan 22.

When the control 12c is operated in the stopped state, the gear 31 is driven in engagement with the gear 30 of the capstan 22 as described above, and the gear 31 is rotated clockwise in FIG. 22. Thus, the lever 49 is lifted upward at the pin 491 by the cam 311 of the gear 31, and is rotated counterclockwise in FIG. 22. When the lever 49 is thus rotated, the chassis 50 is slid in the direction of arrow G, and the recording and playback head and the erasing head contact the tape. The lever 24 is lifted upward by the spring 243 by the projection 496 of the lever 49, is rotated clockwise in FIG. 22, and the roller 23 contacts the capstan 22 under pressure through the tape. Since the chassis 50 is further slid cooperatively in a direction of the arrow G, the lever 46 is moved at the projection 465 along the oblique part 502 of the hole 501. Accordingly, the lever 46 is eventually rotated counterclockwise in FIG. 22, and the gear 47 is engaged with the gear 48. Since the second gear 212 of the gear 21 is rotated counterclockwise at this time, the rotary force is transmitted through the gears 47 and 48 to the shaft 18, and the shaft 18 is thus rotated counterclockwise, thereby performing tape playback.

Even when the control 12d is operated, the mechanism 15 is operated as described above, and the tape is fed, in which case a magnetic tape recorder/player circuit section is switched to the recording state.

Now, the PAUSE mechanism 34 will be described. A PAUSE gear 33 shown in FIG. 2 is not shown, but is formed in the same manner as the gear 32. In other words, those parts corresponding to the guide groove 322, the recess 324, the first and second parts 325 and 326, and the projection 328 of the gear 32 are formed at one surface of the gear 33, those parts corresponding to the inner cam 37, the cam part 372 and the releasing part 373 are formed at the other surface of the gear 33, and a part corresponding to the notch 321 is partly formed. Then, an engaging projection 511 formed at one end of a PAUSE lock lever 51 shown in FIG. 2 is movably engaged within the guide groove of the gear 33. The lever 51 is rotatably supported in such a manner that the shaft 513 projected from the chassis 11 is movably engaged with the long hole 512 formed substantially at the center. The other end of the lever 51 is extended to the side of the control 12e and is engaged with the control 12e. In other words, when the control 12e is operated, the lever 51 interlocked with the operation is rotated counterclockwise in FIG. 2, whereupon the engaging projection 511 of the lever 51 is isolated from the recess of the gear 33, and the gear 33 is driven in engagement with the gear 30.

A PAUSE drive lever 52 is formed as a drive member 65 at the left side in FIG. 2 of the operation section 12. Since the lever 52 is engaged substantially at the center with the shaft 521 projected from the chassis 11, the lever 52 is rotatably supported. The lever 52 is projected at one end with a pin 522, and the pin 522 is engaged with the inner cam of the gear 33. A coiled spring 525 is engaged between the projection 523 projected from the vicinity of the shaft 521 and the projection 524 projected from the chassis 11, and the lever 52 is urged clockwise in FIG. 1, but is rotated until the pin 522 contacts the peripheral wall of the inner wall of the gear 33.

The lever 52 is formed of first control part 526 and a second part 527. The first part 526 is faces the part 244 extended from one side part of the lever 24. The second part 527 faces the projection 466 (only the projection 466 is shown in FIG. 1) projected from the other arm end of the lever 46 shown in FIG. 2.

It is assumed that the cassette magnetic tape recorder/player is operated in the constant feeding state as shown in FIG. 22 and the control 12e is operated. Then, the gear 33 is engaged with and driven by the gear 30 of the capstan 22. Accordingly, the pin 522 of the lever 52 is pressed by the cam of the gear 33, and the lever 52 is rotated counterclockwise in FIG. 1 against the urging force of the spring 525. Then, the first part 526 of the lever 52 urges the part 244 of the lever 24, and the lever 24 is rotated counterclockwise in FIG. 1. In this manner, the roller 23 is isolated from the capstan 22. The second part 527 of the lever 52 urges the projection 466 of the lever 46, and the lever 46 is rotated clockwise in FIG. 1. Consequently, as described with respect to FIG. 22, the gear 47 is isolated from the gear 48, and the rotation of the shaft 18 is stopped. Thus, the recorder/player enters the PAUSE state.

Figure 23:
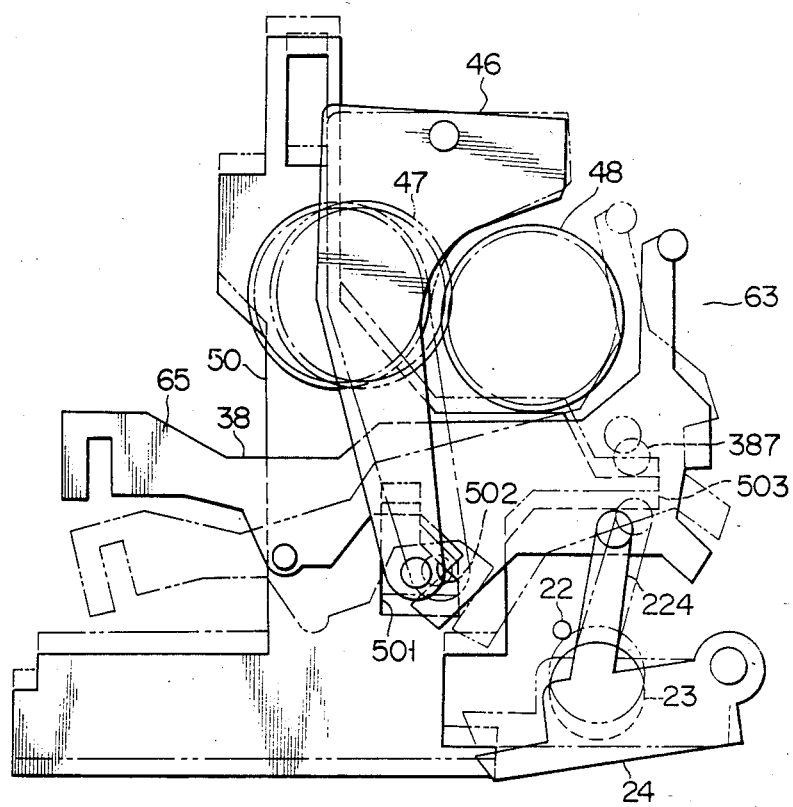
FIG. 23 is a plan view showing the quick feed state and the rewinding state.

In FIG. 23, the positions shown by dotted line of the members are the normal playback state. When the control 12a or 12b is operated in this playback state, the gear 32 is driven, whereupon the lever 38 is rotated to the position shown by the solid lines in FIG. 23. At this time, the pin 387 is projected from one end of the lever 38, and urges the engaging piece 503 projected from one side of the chassis 50 downward in FIG. 23. Accordingly, the chassis 50 is retracted to the position where it is slightly in contact with the recording and playback head via the tape. Then, since the engaging part 503 of the chassis 50 urges the engaging part 244 of the lever 24 downward in FIG. 23, the lever 24 is rotated counterclockwise in FIG. 23, and the roller 23 is isolated from the capstan 22. When the chassis 50 is retracted, the lever 46 is rotated clockwise by the operation of the oblique part 502 of the hole 501, and the gear 47 is isolated from the gear 48. The shafts 17, 18 are driven by the operation of the mechanism 14, thereby performing the rewinding and playback or the fast feeding and playback state.

Figure 24:
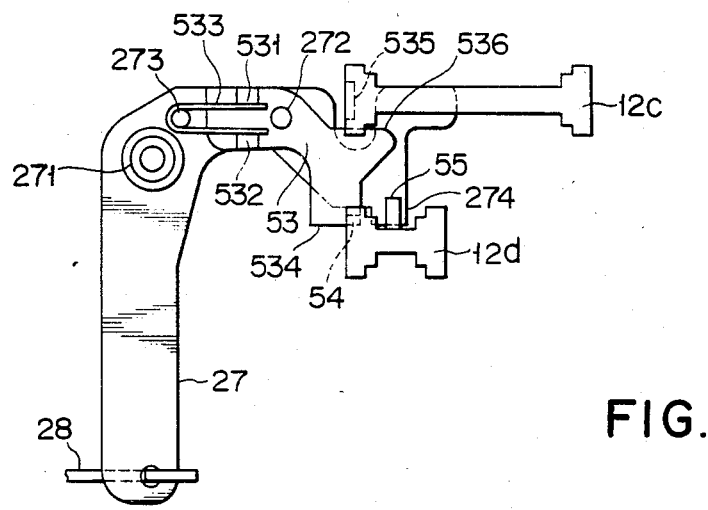
FIG. 24 and FIG. 25 are plan views showing the structure and the operating state respectively of an erasure-preventing mechanism.

The periphery of the control 12d will now be described. As shown in FIG. 24, the lever 27 of a substantially L shape is rotatably supported by the rotational shaft 271, and one end of the lever 27 is connected to one end of the lever 28. A rotational shaft 272 is projected from the other end of the lever 27, the corner of the REC control lever 53, also of a substantially L shape, is engaged with the shaft 272, and is rotatably supported. A pair of engaging pieces 531 and 532 are formed at both sides of one end of the lever 53. A pin 273 is projected from the vicinity of the rotational shaft 271 of the lever 27. The lever 53 is maintained at the position shown in FIG. 24 by a spring 533 which is wound at the center on the pin 273 and which is engaged at both ends with the pieces 531 and 532, respectively, and even if the shaft 272 is rotated in either direction from its position, it is returned to the position shown in FIG. 24.

At the other ends of the levers 53 and 27 engaging parts 54 and 55 are formed at the control 12d which will be described later, and engaging pieces 535 and 274 are engaged with the levers. The upside in FIG. 24 of the other end of the lever 53 is formed as the engaging piece 536 capable of being engaged with the part 535 formed at the left end of the control 12c.

Figure 25:
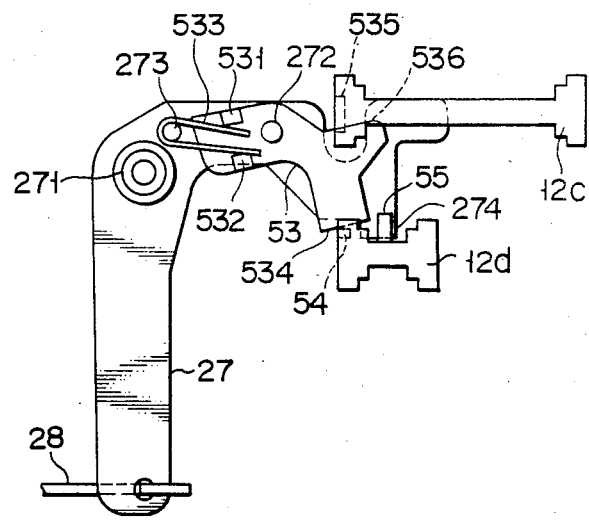

In the case where the erroneous-erasure-preventive-pawl of the magnetic tape cassette is removed, when the control 12d is operated, the engaging piece 534 of the lever 53 is engaged with part 54 of the control 12d as shown in FIG. 25, and is rotated counterclockwise in FIG. 25 against the urging force of the spring 533 engaged with the part 54. At this time, the piece 274 of the lever 27 is engaged with the part 55 of the control 12d, and is rotated counterclockwise in FIG. 25. Since the lever 25 is contacted with the end of the lever 29, as described with respect to FIG. 2, the rotation of the layer 27 is prevented through the lever 28. Accordingly, the part 55 of the control 12d contacts the piece 274 of the lever 27 and cannot be operated, thereby ensuring erroneous erasure prevention.

Figure 26:
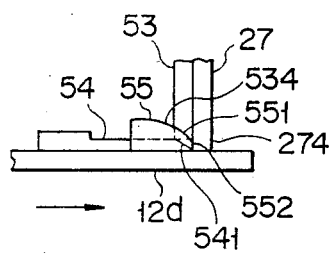
FIG. 26 is a side view showing details of the REC control.

The engaging part 54 of the control 12d will now be described. As shown in FIG. 26, the engaging parts 54 and 55 are aligned in parallel with each other on the control 12d, and oblique parts 541 and 551 are formed at the ends of the control 12d in the operating direction (and hence in the direction of the arrow in FIG. 26). The oblique part 551 is formed through the contact part 552 projected in a substantially vertical manner from the upper surface of the control 12d in FIG. 26. When the control 12d is operated in the direction of the arrow, the pieces 534 and 274 of the levers 53 and 27 are urged upward in the drawing by the parts 534 and 552 of the parts 54 and 55. However, FIG. 26 shows the state in which the erroneous erasure prevention described with respect to FIG. 25 is performed. In other words, in this case, the contact part 552 of the part 55 is in contact with the piece 274 of the lever 27, and the operation of the control 12d is prevented. In the case where the erroneous-erasure-preventing-pawl is not removed, when the control 12d is operated, the piece 534 of the lever 53 is urged by the oblique part 541 of the engaging part 54, and the lever 53 is rotated counterclockwise in FIG. 25. Accordingly, the lever 27 is rotated counterclockwise in FIG. 25 through the spring 533 in cooperation with the lever 53, whereupon the piece 274 of the lever 27 is moved upward in FIG. 26 from the contact part 55 of the control 12d. Since the lever 27 is rotated counterclockwise in FIG. 25 by the part 551 of the part 55 of the control 12d, the lever becomes as shown in FIG. 27, and the control 12d is moved to the operating position, thereby performing the recording state.

Figure 27:
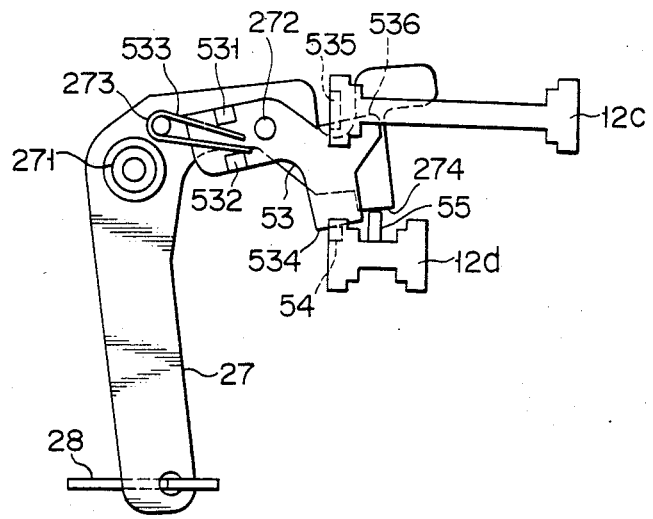
FIG. 27 is a plan view for describing the operation for preventing operation of the PLAY control in the recording state.

In this manner, the piece 536 of the lever 53 faces the part 535 of the control 12c in the recording state shown in FIG. 27. In this manner, even if the control 12c is operated in the recording state, the part 535 contacts the piece 536 of the lever 53. Accordingly, the control 12c is not operated. In other words, the playback is not operated in the recording state.

The reason for preventing the following playback will now be described. This cassette magnetic tape recorder/player is constructed so that only the control 12d can be independently operated in the recording state as described above. In other words, in FIG. 2, when the control 12d is individually operated, the engaging part (not shown) extended from the control 12d is engaged with the engaging part 454 of the lever 45, and the lever 45 is rotated counterclockwise in FIG. 2. In this manner, as described previously with respect to the playback state, the gear 31 is rotated in engagement with the gear 30, the tape is fed in the same manner as the playback state, and the magnetic tape recorder/player circuit section is switched to the recording state. When this is considered corresponding to the mechanism 14 described above, the projection 451 of the lever 45 corresponds to that shown in FIG. 8, becoming engaged with the projection (not shown) of the gear 31.

In this state, when the control 12c is operated, the control 12d is released from locking. However, since the control 12c is instead disposed at the operating position, the lever 45 remains rotated counterclockwise in FIG. 2, and hence, the projection 451 remains engaged with the projection of the gear 31. In other words, the recorder/player is not temporarily stopped and then again switched to the playback mode, but remains in the recording state so that the control 12c is locked at the operating position. Consequently, there occurs an erroneous operation in which the control 12c is operated but the recorder/player remains in the recording state.

Accordingly, as shown in FIG. 27, the control 12c is inhibited in operation in the recording state, thereby preventing the above erroneous operation.

Figure 28:
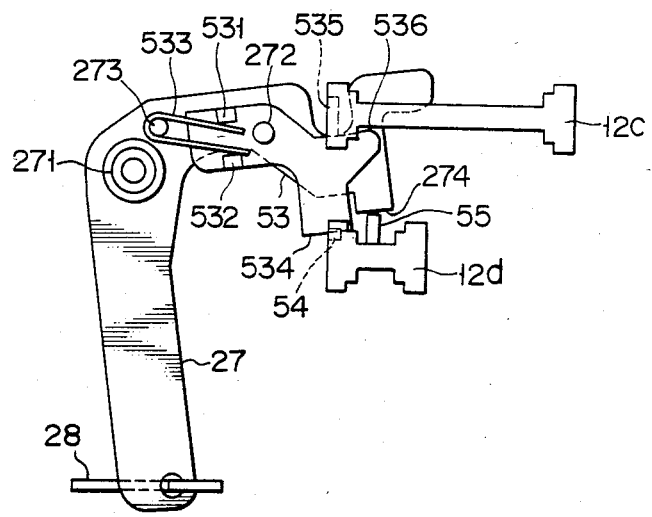
FIG. 28 is a plan view for describing the case where the REC control and PLAY control are simultaneously operated.

This cassette magnetic tape recorder/player of the invention may be used not only for the case where the control 12d is individually operated, but also for the case where both the controls 12d and 12c are simultaneously operated in the recording state. In other words, in this case, as shown in FIG. 28, the levers 53 and 27 are respectively rotated counterclockwise cooperatively with the operation of the control 12d. Since the control 12c is simultaneously operated at this time, the piece 536 of the lever 53 does not face the part 535 of the control 12c, as shown in FIG. 27, but contacts the lower part of part 535. Then, the lever 53 is prevented from rotating at this position, and the control 12c is operated.

What we claim is:

1. A magnetic tape recorder/player comprising:
   a first rotor adapted to be rotated regardless of whether or not magentic tape is being transported;
   a second rotor having a first peripheral part engagable with said first rotor to permit a rotary force to be transmitted from the first rotor to the second rotor and a second peripheral part not engagable with said first rotor so that when the second rotor is in a predetermined annular positon relative to the first rotor the rotary force is not transmitted from the first to the second rotor;
   a lock member having an engaging portion;
   means for driving said lock member in a predetermined direction;
   a guide section formed on said second rotor, said guide section being adapted so that when the lock member moves in said predetermined direction to a first position the guide section engages with said lock member engaging portion so that when the lock member is driven, the second rotor is rotated so as to engage with said first rotor and when said lock member is at a position different from the first position it causes the second rotor to stop;
   a magnetic tape recorder/player mechanism adapted to obtain a predetermined operating state by a rotary force of said second rotor.

2. The magnetic tape recorder/player according to claim 1, wherein said second rotor is formed with a stopping part engaged with said lock member in a state wherein said lock member is returned to a non-driven position in a vicinity of said guide section for stopping rotation of said second rotor, and said lock member is isolated from said stopping part and is engaged with said guide section when said lock member is driven cooperatively with the lock member driving means.

3. The magnetic tape record/player according to claim 2, with further comprises:
   a lock mechanism for holding said lock member at the drive position by locking said lock member driving means in an operating position; and
   an engaging part, provided at said second rotor, for stopping rotation of said second rotor in engagement with said lock member in a state such that said lock member is at the drive position and the second peripheral part of said second rotor faces said first rotor.

4. The magnetic tape recorder/player according to claim 3, wherein said second rotor comprises a cam part, and said tape recorder/player mechanism comprises a drive member moving in accordance with said cam part.

5. The magnetic tape recorder/player according to claim 4, wherein:
   said first rotor is a first gear having teeth;
   said second rotor is a second gear having teeth;
   said lock member is rotated cooperatively with the operation of a tape recorder/player operating section;
   said lock member has a movable rotating center; and
   force applied to said lock member in contact with the end of the teeth of said first and second gears is absorbed by the movement of the rotating center of said lock.

6. The magnetic tape recorder/player according to claim 5, wherein the operation section includes:
   first and second controls for operating the recorder/player in normal and reverse high speed feeding states;

and wherein said recorder further comprises a high speed switching slider for selectively operating said first and second controls and having a projecting at a predetermined position to be slid in one or another direction cooperatively with the operations of said first and second controls;

a high speed switching lever having a movably engaging part movably engaged with said projection provided to substantially cross the sliding direction of said high speed switching slider perpendicularly, said lever rotatably connected to said drive member and the rotating fulcrum of said lever, the high speed switching lever being arranged to approach the projection of said high speed switching slider in a state wherein said drive member is driven by the cam part of said second rotor; and a high speed transmission mechanism for selectively applying rotary force to third and fourth rotors for feeding the tape in normal and reverse feeding states cooperatively with the movement of said high speed switching lever.

7. The magnetic tape recorder/player according to claim 6, wherein:

a notch is formed at one end of said drive member;

a cylindrical projection is formed at one end of said high speed switching lever which cylindrical projection is engaged within said notch;

a torsion spring having one end supported by said drive member for urging said projection deeply into said notch, thereby rotatably connecting said high speed switching lever to said drive member; and flat surfaces stably contacting one end of both said projection and said torsion spring in a tape non-high speed feeding state, a tape normal direction high speed feeding state and a tape reverse direction high speed feeding state at the part contacting one end of said torsion spring of said projection.

8. The magnetic tape recorder/player according to claim 7, wherein:

said high speed transmission mechanism comprises:

third and fourth gears rotating cooperatively with said third and fourth rotors;

a fifth gear rotating irrespective of tape feeding;

a high speed lever rotatably supporting a sixth gear capable of being engaged with said fifth gear, a seventh gear capable of being engaged with said fifth gear engaged with said sixth gear, and an eighth gear capable of being selectively engaged with said third and fourth gears rotated coaxially and integrally with said seventh gear, and rotatably supported to a mounting member, said high speed lever being rotated in a direction to engage said seventh gear with said fifth gear in response to the operation of said high speed switching lever by the operation of said first control and to engage said eighth gear with said third gear, and being rotated in a direction to engage said sixth gear with said fifth gear in response to the operation of said high speed switching lever by the operation of said second control and to engage said eighth gear with said fourth gear, said high speed lever being movable at the rotating center for absorbing the force applied to said high speed lever in contact with the ends of the teeth of said eighth gear and said third and fourth gears.

9. The magnetic tape recorder/player according to claim 8, which further comprises:

a third control for operating the tape of said tape recorder/player operating section in a constant speed feeding state;

a head chassis moved to the position corresponding to the tape constant speed feeding state in response to the cam part of said second rotor rotated corresponding to the operation of said third control;

a ninth gear rotating cooperatively with said third rotor; and a constant speed lever capable of being engaged with said ninth gear and rotatably supporting a tenth gear rotated irrespective of the tape feeding, said constant speed lever being moved to contact and isolate said tenth gear with and from said ninth gear cooperatively with the operation of said head chassis.

10. The magnetic tape recorder/player according to claim 9, wherein:

said drive member comprises an engaging part engaged with said head chassis in the state that said first and second controls are operated in the tape constant speed feeding state for forcibly moving said head chassis in the non-drive position direction.

11. The magnetic tape recorder/player according to claim 10, which further comprises:

a fourth control for temporarily stopping the tape constant speed feeding of said tape recorder/player operating section;

a pause drive lever adapted to be moved in a predetermined direction in response to the cam part of said second rotor rotated in response to the operation of said fourth control, said drive lever having an engaged part engaged with said constant speed lever for forcibly moving said constant speed lever in a direction that said tenth gear is isolated from said ninth gear.

12. The magnetic tape recorder/player according to claim 11, which further comprises:

fifth control for operating the tape of said tape recorder/player operating section in recording state, said fifth control having first engaging part projected from said fifth control with an oblique part, a contact part projected in a substantially vertical manner from the surface of said fifth control, and a second engaging part projected from said contact part with an oblique part;

an erroneous-erasure-preventing-lever provided to face said second engaging part of said fifth control, which cannot be moved in the recording inhibiting state but which is movable in the recording enabling state;

a control lever movably supported on said erroneous-erasure-preventing-lever and provided to face the first engaging part of said fifth control;

said erroneous-erasure-preventing-lever moved to the position so as not to face the contact part of said second engaging part cooperatively with the movement of said control lever by the oblique part of said first engaging part when said fifth control is operated in the recording enabling state, thereby allowing said fifth control to be operated;

said control lever being moved when said fifth control is operated in the recording inhibiting state but said erroneous-erasure-preventing-lever being not moved, and the operation of said fifth control being prevented by facing said contact of said fifth control with said erroneous-erasure-preventing-lever; and said control lever reaching the position for preventing the operation of said control in the tape reproducing state by the operating state of said fifth control.

* * * * *